July 3, 1928.
C. H. POWELL
1,676,231
AIRPLANE CONSTRUCTION
Filed July 30, 1926
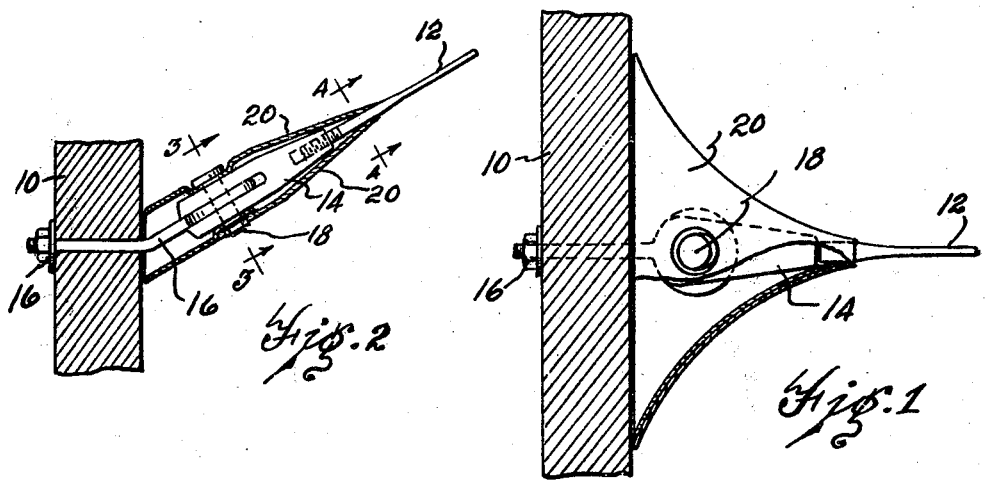
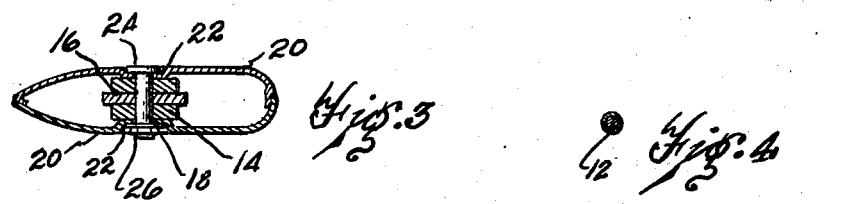
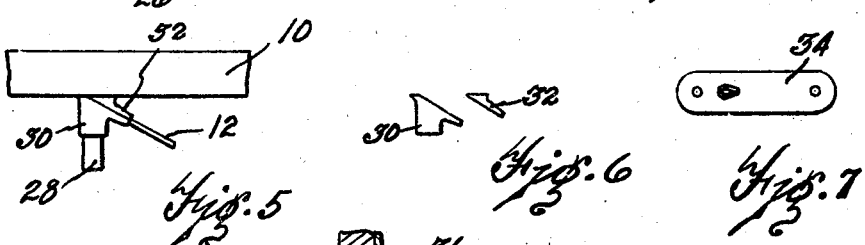
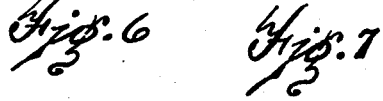
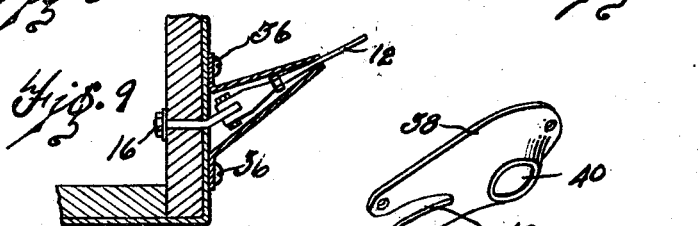
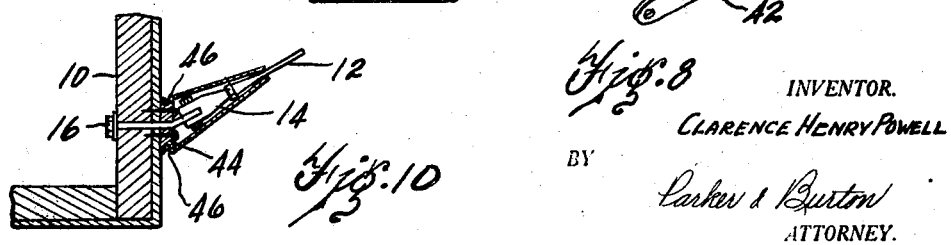
INVENTOR.
CLARENCE HENRY POWELL
BY
Parker & Burton
ATTORNEY.

Patented July 3, 1928.

1,676,231

UNITED STATES PATENT OFFICE.

CLARENCE HENRY POWELL, OF DETROIT, MICHIGAN, ASSIGNOR OF ONE-HALF TO RALPH J. BURTON, OF DETROIT, MICHIGAN.

AIRPLANE CONSTRUCTION.

Application filed July 30, 1926. Serial No. 125,839.

My invention relates to improvements in the streamlining of aircraft, particularly airplanes.

Accurate and complete streamlining in order to reduce to a minimum the air resistance of an airplane is a matter of considerable importance wherefore the braces used in its construction, such as the struts and wires, are now streamlined and it has been found that such practice materially increases the possible rate of travel of the craft. The connections, however, whereby these braces are secured to parts of the craft, such as the wing members or fuselage, offer, if exposed, considerable resistance; and if concealed within the interior of the wing member or fuselage wall, they are not readily accessible for inspection.

My invention relates to improvements in streamlining these connections and is illustrated as embodied in a housing or sheath adapted to surround such a connection and which housing is preferably readily removable to permit examination of the connection. It is simple and inexpensive, of rugged durable construction, and unusually effective in accomplishing the purpose for which it is employed.

Other objects and advantages together with meritorious details of construction will more fully appear from the following description of the illustrative embodiments shown in the accompanying drawings, in which:

Fig. 1 is a fragmentary elevation partly in section illustrating my invention.

Fig. 2 is a sectional view showing the construction illustrated in Fig. 1.

Fig. 3 is a sectional view taken on line 3—3 of Fig. 2.

Fig. 4 is a sectional view taken on line 4—4 of Fig. 2.

Fig. 5 is a fragmentary elevation of a modification of my invention.

Fig. 6 is an elevation of the device shown in Fig. 5.

Fig. 7 is a plan of a second modification of my invention.

Fig. 8 is a perspective of a third modification of my invention.

Fig. 9 is a sectional view of the structure shown in Fig. 7.

Fig. 10 is a sectional view of an additional modification of my invention.

In airplane construction it is necessary that braces such as the struts and wires be secured to the parts to be braced by suitable connections which are commonly positioned externally the wing or fuselage to which the brace is attached. When so exposed this connection offers very considerable air resistance and impedes the travel of the machine. It is not uncommon practice to mount this connection within the interior of the wing or fuselage, yet while this character of mounting offers no wind resistance, it is not readily accessible. Such interior mounting is frequently adopted, however, particularly in racing machines. The resistance offered by an exposed connection is considerably greater than what would normally be assumed.

I have provided an improved streamlined housing adapted to be supported about a connection such as above referred to. Various modifications of my invention are shown in the figures of the drawing. A preferred construction is illustrated in Figs. 1, 2, 3, and 4. In such figures of the drawing, let 10 indicate a part of the aircraft such as a wing member or fuselage member to which connection is made of a brace member such as a wire 12. It is common practice at the present time to streamline these wires 12. The ends of the wires, however, are normally left round in cross-section and are threaded to be engaged with a coupling 14, which may be secured to an attachment 16 as by a pin 18.

My invention comprises a streamlined housing adapted to surround the connection between the wire and that portion of the ship to which it is attached, which housing is shown in Figs. 1 to 4 inclusive as comprising a pair of clamshell like complementary sections 20. These sections preferably have interlocked edges as shown in Fig. 3 and may be held together by the pin or bolt 18 which secures the wire 12 to the attachment 16, which shell is here shown as provided with a depression 22. The head 24 of the pin 18 seats within the depression 22 in one shell and the nut 26 carried by the pin 18 seats within the depression 22 of the complementary shell. The two shells are suitably streamlined to offer the least possible air resistance and taper from the base which joins the part 10 of the ship to a point which is here shown as surrounding the circular portion of the wire 12 as shown in Fig. 1. If the shell engages about the circular portion of the wire as is here illustrated, it is possible to rotate the wire to adjust its tension without removing the shell.

In Figs. 5 and 6 I have shown a modified form of construction adapted to serve as a housing to enclose the connection formed between a strut 28 and a wire 12 and the part 10 of the aircraft. This housing is formed in two connections, 30 and 32, which may be fastened in position in a suitable manner as by means of screws such as are used to secure the housing shown in Fig. 9 in place.

In Fig. 7 I have illustrated my invention as comprising a unitary structure 34 which is shown in Fig. 9 as fastened in place by means of screws 36, so as to cover the connection formed between the wire 12 and the attachment 16. In this instance the housing extends along the wire on to the flatted streamlined portion thereof. I prefer to form the housing of light deformable metal so that if desired it may be crimped closely about the wire 12. In Fig. 8 I have shown a housing 38, having an opening 40, to receive a strut such as 28 and a slit 42 to receive a wire such as 12 where the construction is as shown in Fig. 5. In Fig. 10 I have shown a housing such as is illustrated in Fig. 7. Instead of employing screws 36 to fasten the same into position, I make use of a fastening plate 44 which has a grooved periphery and the base of the housing is crimped therein as at 46. The housing tapers to a point adjacent the wire 12 as heretofore described and the construction otherwise is as has already been set forth.

With my improved housing it is possible to readily remove the same to inspect the connections. The connection between the brace, whether a wire or strut, with the adjacent portion of the machine, is streamlined so that the air resistance is reduced to a minimum.

What I claim is:

1. A housing for the fitting of an aircraft, comprising a pair of complementary clamshells provided with interlocking edges secured together by a pin extending transversely therethrough and having a head at each end seated within a recess formed in said shells.

2. An aircraft having a wire connection provided with a transversely extending pin, a streamlined wire having a round end portion threaded into said connection, a streamlined housing comprising a pair of complementary clamshells held together by said pin about said connection and wire, said housing terminating at one end in a part surrounding the round portion of the wire permitting rotation thereof.

3. An aircraft having a connection for a wire, a streamlined wire having a round end portion threaded into said connection and a streamlined housing having a part embracing the round end portion of the wire whereby rotation of the wire is permitted and extending therefrom to completely enclose the connection.

4. In an aircraft having a streamlined member secured by a suitable connection to a part of the craft, a streamlined housing about said member and connection and comprising a pair of complementary shells.

5. In an aircraft having a streamlined brace secured by a suitable connection to a part thereof, a streamlined housing about said connection consisting of complementary shells secured together by a pin extending transversely therethrough, which pin has end portions disposed within recesses formed within said shells.

6. In an aircraft having a streamlined wire secured thereto by a connection provided with a transverely extending pin, a streamlined housing about said connection comprising a pair of complementary shells secured together by said pin.

7. In an aircraft having a streamlined wire secured thereto by a connection provided with a transversely extending pin, a streamlined housing about said connection comprising a pair of complementary shells secured together by said pin, said pin provided with a head at each end, each shell provided with a depression adapted to receive one of the heads of said pin.

8. In an aircraft having a streamlined strut fastened at one end by a connection to a part of the craft and a streamlined wire extending angularly from a point in proximity said connection, a streamlined housing about said connection having a flaring end abutting said part of the craft and tapered to its point of contact with the strut and provided with an opening for the streamlined wire.

9. In an aircraft having angularly disposed parts secured together by an external connection, a streamlined housing detachably secured to one of said parts surrounding said connection and embracing the other of said parts.

10. In an aircraft having a pair of angularly disposed parts secured together, a streamlined housing removably secured to one of said parts and surrounding the joint formed between said parts.

11. In an aircraft having a pair of angularly disposed parts secured together, a streamlined housing surrounding one of said parts and the joint formed therebetween, said housing being capable of movement longitudinally with respect to one of said parts to uncover said point.

12. In an aircraft, a portion having a streamlined wire secured thereto by an external connection, a streamlined sheath about said connection tapered from its point of contact with said portion to its point of contact with the wire.

13. In an aircraft having a streamlined member provided with an external connection at one end, a streamlined sheath surrounding said connection and capable of movement longitudinally with respect to the member to uncover the connection.

14. In an aircraft having a brace fastened thereto by a connection, a housing of light deformable material about said connection and brace and tapered from a reduced end closely engaging said brace to an enlarged opposite end.

15. In an air aircraft, a streamlined brace fastened thereto by a connection, a streamlined housing of light deformable material surrounding said connection and having one end crimped into close contact with the brace.

16. In an aircraft, a brace fastened thereto by a connection, a streamlined housing about said connection having an enlarged end portion secured to a part of the ship and a reduced end portion surrounding the brace.

17. In an aircraft, a streamlined brace fastened at one end by a connection to a part of the craft, a streamlined housing about said connection flaring from an enlarged end adjacent said part of the craft to a reduced end fitting closely about the said brace, said housing being formed in a plurality of sections and provided with means for being fastened in place.

18. In an aircraft, a brace wire shaped so as to have low head resistance and provided with an end connection securing the wire to a part of the craft and a housing shaped so as to have low head resistance surrounding said wire and enclosing said connection.

19. In an aircraft, a flattened brace wire having a threaded end portion, a connection adjustably secured to such end and a streamlined sheath assembly positioned about said connection.

20. In an aircraft, a flattened brace wire adjustably secured to a connection carried by the craft and a streamlined housing surrounding said connection and extending beyond the end thereof along the wire, said housing forming no part of the connection and being readily removable to permit inspection thereof.

21. An aircraft having an external fitting, a flattened brace wire threadedly engaged with said fitting and a streamlined housing surrounding said wire and enclosing said fitting, said housing so embracing the wire as to permit rotation thereof with respect to the fitting.

22. In an aircraft, a flattened brace wire, a forked end connection adjustably threaded thereon, means securing said connection to a part of the craft, a streamlined housing surrounding said means and connection and snugly engaging about said wire.

In testimony whereof, I sign this specification.

CLARENCE HENRY POWELL.